United States Patent
Vinokour et al.

(10) Patent No.: US 7,808,994 B1
(45) Date of Patent: Oct. 5, 2010

(54) FORWARDING TRAFFIC TO VLAN INTERFACES BUILT BASED ON SUBSCRIBER INFORMATION STRINGS

(75) Inventors: Vitali Vinokour, Arlington, MA (US); Linda M. Cabeca, Waltham, MA (US); Karen Ruben, Lexington, MA (US); Steve Onishi, Groton, MA (US); Christopher Roche, North Andover, MA (US); Brian M. Sullivan, Lexington, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1041 days.

(21) Appl. No.: 11/540,923

(22) Filed: Sep. 29, 2006

Related U.S. Application Data

(63) Continuation-in-part of application No. 11/402,145, filed on Apr. 11, 2006, now Pat. No. 7,492,766.

(60) Provisional application No. 60/775,740, filed on Feb. 22, 2006.

(51) Int. Cl.
*H04L 12/28* (2006.01)
*H04L 12/56* (2006.01)

(52) U.S. Cl. .................. 370/392; 370/401; 709/238

(58) Field of Classification Search .................. None
See application file for complete search history.

(56) References Cited

U.S. PATENT DOCUMENTS

| | | |
|---|---|---|
| 5,557,748 A | 9/1996 | Norris |
| 5,613,096 A | 3/1997 | Danknick |
| 5,903,754 A | 5/1999 | Pearson |
| 6,131,163 A | 10/2000 | Wiegel |
| 6,195,355 B1 | 2/2001 | Demizu |
| 6,496,479 B1 | 12/2002 | Shionozaki |
| 6,570,875 B1 | 5/2003 | Hegde |

(Continued)

FOREIGN PATENT DOCUMENTS

JP  2005-252762  9/2005

(Continued)

OTHER PUBLICATIONS

Notification of Rejection Decision for Chinese Application No. 200610169455.1 dated May 8, 2009.

(Continued)

*Primary Examiner*—Hong Cho
*Assistant Examiner*—Robert C Scheibel
(74) *Attorney, Agent, or Firm*—Shumaker & Sieffert, P.A.

(57) ABSTRACT

Techniques are described that allow a network device, such as a router, to forward data packets received from a subscriber device to an Ethernet virtual local area network (VLAN) interface within the network device where the VLAN interface has been dynamically built based on a subscriber information string. For example, a primary VLAN sub-interface (PVS) and a subscriber VLAN sub-interface (SVS) may each be dynamically built over a statically built VLAN major interface. In particular, the network device comprises a forwarding controller, where the forwarding controller receives a data packet over an Ethernet port. The network device accesses upper-layer protocol information within the data packet to determine an SVS within the network device to which to forward the data packet based on the upper-layer protocol information.

26 Claims, 6 Drawing Sheets

U.S. PATENT DOCUMENTS

| | | | |
|---|---|---|---|
| 6,693,878 B1* | 2/2004 | Daruwalla et al. | 370/235 |
| 6,862,274 B1 | 3/2005 | Tsao et al. | |
| 6,990,107 B1 | 1/2006 | Rinne et al. | |
| 7,079,527 B2 | 7/2006 | Owens | |
| 7,231,452 B2 | 6/2007 | Ananda et al. | |
| 7,269,135 B2 | 9/2007 | Frick et al. | |
| 7,272,137 B2 | 9/2007 | Unitt et al. | |
| 7,298,705 B2 | 11/2007 | Shankar et al. | |
| 7,373,425 B2* | 5/2008 | Barrack et al. | 709/238 |
| 2002/0019875 A1 | 2/2002 | Garrett et al. | |
| 2002/0027906 A1 | 3/2002 | Athreya et al. | |
| 2002/0103921 A1 | 8/2002 | Nair et al. | |
| 2003/0009548 A1 | 1/2003 | Poynor | |
| 2003/0041266 A1* | 2/2003 | Ke et al. | 713/201 |
| 2003/0065799 A1* | 4/2003 | Kitamura | 709/230 |
| 2003/0140153 A1 | 7/2003 | Lawrence | |
| 2003/0174731 A1 | 9/2003 | Tafazolli et al. | |
| 2003/0210697 A1 | 11/2003 | Mercier | |
| 2004/0062204 A1 | 4/2004 | Bearden et al. | |
| 2004/0075535 A1 | 4/2004 | Propp et al. | |
| 2004/0088389 A1* | 5/2004 | Shah | 709/221 |
| 2005/0071446 A1 | 3/2005 | Graham et al. | |
| 2005/0099976 A1 | 5/2005 | Yamamoto et al. | |
| 2005/0120122 A1 | 6/2005 | Farnham | |
| 2005/0232228 A1 | 10/2005 | Dharanikota et al. | |
| 2005/0232294 A1* | 10/2005 | Quigley et al. | 370/436 |
| 2005/0238050 A1 | 10/2005 | Pung et al. | |
| 2005/0265397 A1 | 12/2005 | Chapman et al. | |
| 2006/0026669 A1 | 2/2006 | Zakas | |
| 2006/0028998 A1 | 2/2006 | Lioy et al. | |
| 2006/0126616 A1 | 6/2006 | Bhatia | |
| 2006/0209836 A1* | 9/2006 | Ke et al. | 370/392 |
| 2006/0221950 A1* | 10/2006 | Heer | 370/389 |
| 2006/0245439 A1 | 11/2006 | Sajassi | |
| 2006/0274774 A1 | 12/2006 | Srinivasan et al. | |
| 2007/0047549 A1 | 3/2007 | Park | |
| 2007/0076607 A1* | 4/2007 | Voit et al. | 370/230 |
| 2007/0097972 A1 | 5/2007 | Jain et al. | |

FOREIGN PATENT DOCUMENTS

| | | |
|---|---|---|
| WO | WO 03/067824 | 8/2003 |
| WO | WO 2005/112363 A1 | 11/2005 |

OTHER PUBLICATIONS

Notification of Second Office Action for Chinese Application No. 200610169455.1 dated Oct. 9, 2009.

U.S. Appl. No. 11/331,584, entitled "Dynamic Virtual Local Area Network (VLAN) Interface Configuration," filed Jan. 13, 2006.

U.S. Appl. No. 11/031,857, entitled "Dynamic Interface Configuration for Supporting Multiple Versions of a Communication Protocol," filed Jan. 7, 2005.

Notice of Reasons for Rejection dated Jan. 27, 2009, for corresponding Japanese Patent Application No. 2006-195561, 3 pgs.

European Search Report dated Mar. 12, 2007, for corresponding European Application No. 06115242.7-2416, 8 pgs.

Notice of Reasons for Rejection of Japanese Application No. 2006-195561 date Jan. 5, 2010, 12 pp.

Notification of Third Office Action of Chinese Application No. 200610169455.1 dated Jan. 22, 2010, 12 pp.

\* cited by examiner

US 7,808,994 B1

FORWARDING TRAFFIC TO VLAN INTERFACES BUILT BASED ON SUBSCRIBER INFORMATION STRINGS

This application is a continuation-in-part of application Ser. No. 11/402,145, filed Apr. 11, 2006, which claims the benefit of U.S. Provisional Application No. 60/775,740, filed Feb. 22, 2006, the entire content of each of which is incorporated herein by reference.

TECHNICAL FIELD

The invention relates to computer networks, and more particularly to interface configuration of network devices.

BACKGROUND

Customer networks are networks established by individuals or companies for internal communication. Customer networks may include local area networks (LANs) or wide area networks (WANs) that comprise a plurality of subscriber devices, such as personal computers, laptops, workstations, personal digital assistants (PDAs), wireless devices, network-ready appliances, file servers, print servers, or other devices. The customer networks may meet customer-specific needs using a number of different communication protocols, such as Asynchronous Transfer Mode (ATM) protocol, Ethernet protocol, Bridged Ethernet protocol, frame relay protocols, or other communication protocols. ATM and frame relay protocols, for example, are frequently used for transport of audio, video, and computer data between source and destination devices within a customer network. Such protocols may transfer information in fixed-length units, such as frames.

In order to allow remote customer networks to communicate, Internet Protocol (IP) based communication techniques are being developed that relay frames through an IP-based network, such as the Internet. According to the techniques, a network service provider of the IP network can receive frames from one of the customer networks, encapsulate the frames within packets, and route the packets through the IP network to another customer network.

Service provider networks include network devices, such as routers, that provide subscriber devices of the customer networks with access to the Internet or another network. For example, multiple subscriber devices may connect to a network switch, e.g., a digital subscriber line access multiplexer (DSLAM), maintained by the service provider network. Although data for the multiple subscriber devices connected to the network switch are transported over the same physical connection, each of the subscriber devices typically has a dedicated subscriber interface, e.g., an ATM virtual circuit (VC) or an Ethernet virtual local area network (VLAN), to the network device and hence the Internet.

VLANs are a generic grouping mechanism for Ethernet packets independent of media access control (MAC) addressing. VLANs enable the network switch to multiplex multiple protocol interfaces over a single physical Ethernet port. For example, the network switch may present both IP interfaces and Point-to-Point Protocol over Ethernet (PPPoE) interfaces on one or more VLANs. Typically, an Ethernet frame header includes a VLAN identification (VID) tag that identifies the VLAN associated with the Ethernet packet. The VLAN may comprise either a single tagged VLAN or a double tagged VLAN. A single tagged VID identifies the subscriber device that sent the packet to the network device. A double tagged VID identifies both the subscriber device that sent the packet and the network switch that transferred the packet from the subscriber device to the network device. Use of VIDs allows applications, such as a Broadband Remote Access Server (BRAS) application, to identify specific subscriber devices, thereby allowing these types of applications to provide subscriber specific services.

Currently, service provider networks are migrating away from ATM to Ethernet based infrastructures; however, many of these service providers are either functionally unable or refuse to include VIDs in Ethernet frame headers. Without VIDs, applications, such as a BRAS application, may no longer easily distinguish between multiple subscriber devices, which may significantly limit the ability to deliver subscriber specific services.

SUMMARY

In general, the invention is directed to techniques for forwarding data packets received by a network device from a subscriber device to an Ethernet virtual local area network (VLAN) interface within the network device where the VLAN interface has been dynamically built based on a subscriber information string. For example, a primary VLAN sub-interface (PVS) and a subscriber VLAN sub-interface (SVS) may each be dynamically built over a statically built VLAN major interface. In addition, techniques are described that allow a network device, such as a router, to forward the subsequently received data packets according to the correct SVS even though the subscriber information strings or VLAN identification (VID) identifying the VLAN interfaces are typically not present in the data packets received by the network device from subscriber devices after the SVSs have been dynamically constructed.

For example, the network device may employ the techniques to access information from an upper-layer protocol portion of received data packets, and use the upper-layer protocol information to identify the correct SVS to which to forward a received data packet. The data packet is then forwarded to the SVS and passed up an interface stack for processing into an IP packet to be injected into a network. In this way, the network device may provide subscriber specific services by resolving data packets to the proper SVS even though the data packets may not include VID or subscriber information strings. This is in contrast to conventional methods, which typically do not access upper-layer protocol information when forwarding packets. As used herein, the term "upper-layer protocol" refers to protocols above the particular Physical Layer (Layer 1) and lower Data Link Layer (Layer 2) protocols by which the network device receives the packets from the clients. This generally includes protocols that are viewed as in or above the Network Layer (Layer 3) of the OSI Network Model, as well as certain types of protocols that are viewed as within the "upper-half" of the Data Link Layer (Layer 2). Examples of upper-layer protocols include Dynamic Host Configuration Protocol (DHCP), which is a Layer 3 protocol for automatically assigning IP addresses. Another example of an upper-layer protocol, as the term is used herein, is the Point-to-Point Protocol over Ethernet (PPPoE) protocol, which can be viewed as residing within the upper-half of Layer 2 as it provides wrapper functions by encapsulating a different Layer 2 protocol, the point-to-point protocol (PPP) in this case.

The network device comprises an interface controller and a forwarding controller that includes an Ethernet port that receives packets. Upon receiving a data packet, such as an IP data packet or a PPPoE data packet on the Ethernet port, the network device accesses upper-layer protocol information within the data packet to determine an SVS within the network device to which to forward the data packet based on the upper-layer protocol information.

In one example embodiment, upon receiving an IP data packet, the network device obtains the source IP address from IP information contained within the IP data packet. The network device does a lookup in an IP host table using as a key the combination of the source IP address of the IP data packet and the IP interface over the PVS on which the IP data packet was received. Based on this lookup, the IP host table may return the IP interface over the SVS. From this, the network device may determine the SVS to which to forward the IP data packet.

In another example embodiment, upon receiving a PPPoE data packet, the network device obtains the session ID from information contained within the PPPoE data packet. The network device does a lookup in a session table using as a key the session ID contained in the data packet. Based on this lookup, the session table may return a PPPoE sub-interface. Based on this information, the network device may determine the SVS that is associated with the PPPoE sub-interface, and forward the PPPoE data packet to the SVS. In either embodiment, if a lookup of the IP host table or the session table indicates there is no SVS built for the subscriber that sent the data packet, the data packet may be dropped until a protocol signaling packet is received to initiate building the PVS and SVS, as described below.

In one embodiment, a method comprises receiving a data packet on an Ethernet port of a network device, and accessing upper-layer protocol information contained in the data packet. The method further comprises determining a subscriber virtual local area network (VLAN) sub-interface (SVS) of the network device to which to forward the data packet based on the upper-layer protocol information.

In a further embodiment, a network device comprises an interface that includes an Ethernet port for receiving a data packet, and a forwarding controller that receives the data packet from the Ethernet port, wherein the data packet includes upper-layer protocol information. The forwarding controller accesses the upper-layer protocol information and determines a subscriber virtual local area network (VLAN) sub-interface (SVS) of the network device to which to forward the data packet based on the upper-layer protocol information.

In another embodiment, a computer-readable medium comprises instructions that cause a programmable processor to receive a data packet on an Ethernet port of a network device. The computer-readable medium further comprises instructions to cause the programmable processor to access upper-layer protocol information contained in the data packet, and determine a subscriber virtual local area network (VLAN) sub-interface (SVS) of the network device to which to forward the data packet based on the upper-layer protocol information.

In yet another embodiment, a method comprises receiving a control packet from a subscriber device that contains a subscriber identifier that identifies the subscriber device, and establishing an interface on a network device using the subscriber identifier. The method further includes receiving a data packet from the subscriber device that does not contain the subscriber identifier, accessing other information contained in the data packet, and determining the interface to which to forward the data packet based on the other information.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
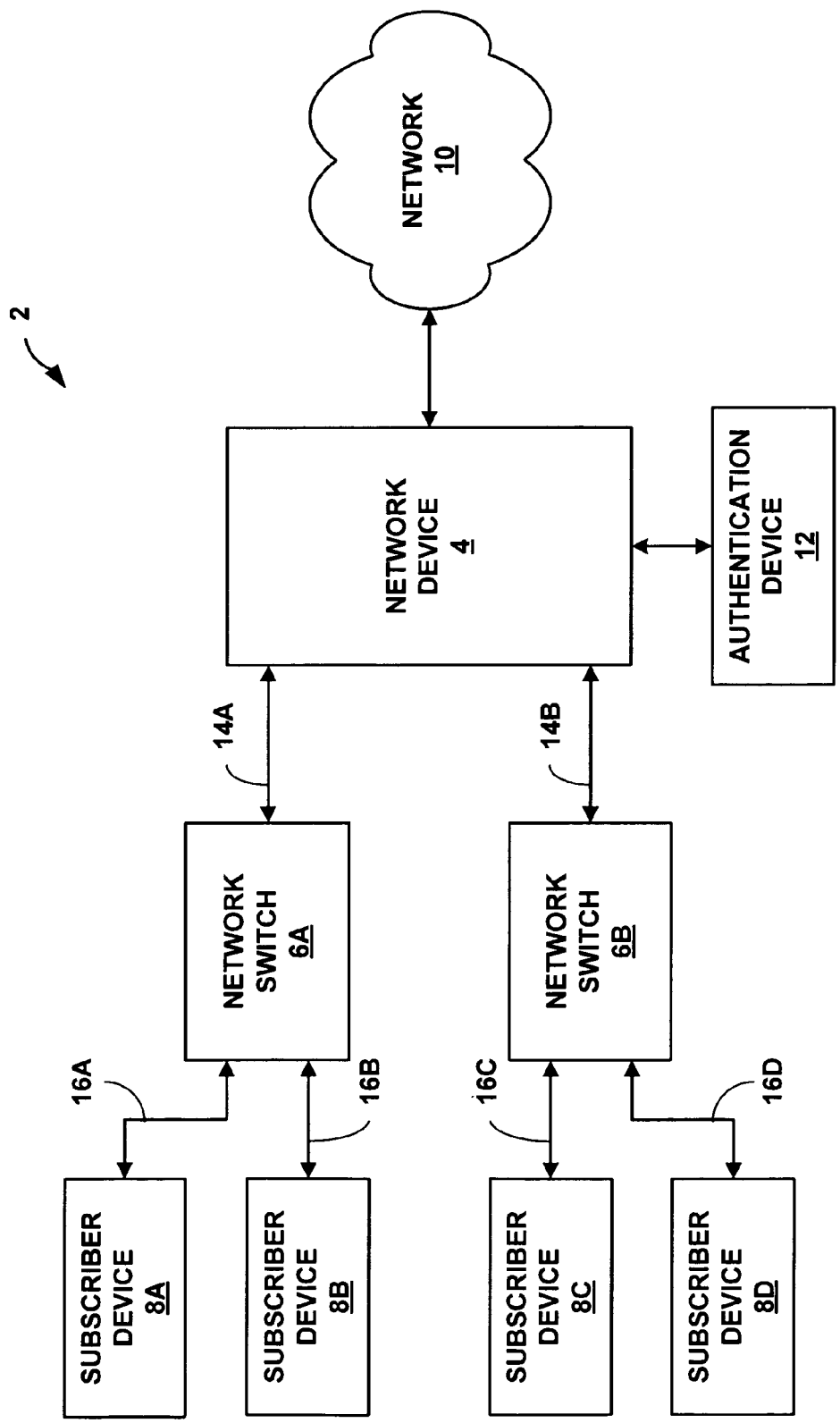
FIG. 1 is a block diagram illustrating an exemplary system in which a network device provides subscriber devices with connectivity to a network.

FIG. 1 is a block diagram illustrating an exemplary system 2 in which a network device 4 provides subscriber devices 8A-8D ("subscriber devices 8") with connectivity to a network 10. System 2 comprises an Ethernet infrastructure; however, in other embodiments, system 2 may comprise another layer 2 protocol infrastructure, such as an Asynchronous Transfer Mode (ATM) infrastructure. Subscriber devices 8 connect to network device 4 via network switches 6A and 6B ("network switches 6"). Network switches 6 transfer Ethernet packets received from subscriber devices 8 to network device 4 over Ethernet virtual local area networks (VLANs).

The invention described herein provides techniques for receiving data packets at network device 4 from subscriber devices 8 and resolving the data packets to respective subscriber VLAN sub-interfaces (SVSs) over a VLAN major interface statically built over an Ethernet port of network device 4. Each data packet is forwarded to the respective SVS and passed up an interface stack for processing into an IP packet to be injected into network 10. The SVS is dynamically built as part of an Ethernet VLAN interface within network device 4 based on subscriber information strings included within a plurality of packets, as opposed to conventional techniques which require VLAN identification (VID) to dynamically build an Ethernet VLAN interface for a specific one of subscriber devices 8. In some cases, the subscriber information strings may be referred to as agent circuit identifiers (ACIs).

Network device 4 dynamically builds Ethernet VLAN interfaces based on subscriber information strings included in a plurality of protocol signaling packets, such as Dynamic Host Configuration Protocol (DHCP) discovery packets and Point-to-Point Protocol over Ethernet (PPPoE) Active Discover Initiation (PADI) and PPPoE Active Discover Request (PADR) packets. Dynamically building the Ethernet VLAN interface based on subscriber information strings allows network device 4 to differentiate between subscriber devices 8 even though the plurality of packets may not include VIDs. In differentiating between subscriber devices 8, network device 4 may continue to provide subscriber-specific services to subscriber devices 8. However, subsequent data packets that subscriber devices 8 send to network device 4 may not include the subscriber information strings. As described in further detail below, network device 4 resolves the data packets to the correct SVS based on upper-protocol information contained in the data packets. For example, network device 4 may access a subscriber-specific portion of an IP header of the data packet.

In general, the term "interface" is used herein to refer to a software interface that is created or otherwise instantiated within a network device to support network communications. The term "interface stack" refers to a layered representation of multiple software interfaces that may be viewed as a stack or a column of interfaces. Network data propagates up or down the interfaces of the interface stack, and each interface typically corresponds with a different network communication protocol or format. In general, the software interfaces of the interface stack created by the network device correspond with one or more layers of the seven layer Open System Interconnection (OSI) networking model.

Network 10 represents any computer network and may have a variety of networked resources capable of data communication. For example, network 10 may include routers, hubs, gateways, servers, workstations, network printers and faxes or other devices. Network 10 may comprise an Internet Protocol (IP) network that includes both an IP version four (IPv4) portion and an IP version six (IPv6) portion. Moreover, network 10 may represent the Internet or any public or private network.

Subscriber devices 8 may comprise personal computers, laptops, workstations, personal digital assistants (PDAs), wireless devices, network-ready appliances, file servers, print servers or other devices. In some cases, subscriber devices 8 may be included within one or more customer networks. For example, subscriber devices 8A and 8B may be included in one customer network and subscriber devices 8C and 8D may be included in another customer network. Customer networks represent networks established by individuals or companies for internal communication and may include local area networks (LANs) or wide area networks (WANs) that comprise a plurality of subscriber devices. In some embodiments, customer networks may be customer-specific networks that use the Ethernet protocols or another layer 2 protocol to communicate information in fixed or variable-sized units referred to as frames.

In the illustrated example, subscriber devices 8A and 8B connect to network device 4 via network switch 6A, and subscriber devices 8C and 8D connect to network device 4 via network switch 6B. In other embodiments, any number of network switches 6 may connect to network device 4 and any number of subscriber devices 8 may connect to each of the network switches. In one embodiment, network switches 6 may comprise digital subscriber line access multiplexers (DSLAMs) or other switch devices. Each of subscriber devices 8 may utilize a Point-to-Point Protocol (PPP) 16A-16D ("PPP 16"), such as PPPoE, to communicate with network switches 6. For example, using PPP 16, one of subscriber devices 8 may request access to network 10 and provide login information, such as a username and password. PPP 16 may be supported on digital subscriber lines (DSLs) that connect subscriber devices 8 with network switches 6. In other embodiments, subscriber devices 8 may utilize a non-PPP protocol to communicate with network switches 6.

Each of network switches 6 may communicate with network device 4 over a physical Ethernet interface supporting Ethernet protocols 14A-14B ("Ethernet protocols 14"). Network device 4 typically includes Broadband Remote Access Server (BRAS) functionality to aggregate output from switches 6 into a higher-speed uplink to network 10. Although data for subscriber devices 8 are transported from each of network switches 6 to network device 4 over the same physical connection, each of subscriber devices 8 may have a dedicated Ethernet port to communicate Ethernet frames to network device 4 and hence to network 10. In some embodiments, network device 4 may comprise a router that maintains routing information between subscriber devices 8 and network 10.

Virtual local area networks (VLANs) are a generic grouping mechanism for Ethernet packets that are independent of media access control (MAC) addressing. Exemplary Ethernet VLAN interfaces include one of a Fast Ethernet interface, a Gigabit Ethernet interface, a 10-Gigabit Ethernet interface or any other type of Ethernet network interface. VLANs enable each of network switches 6 to multiplex multiple protocol interfaces over a single physical Ethernet port. For example, network switch 6A may multiplex IP and PPPoE interfaces to one or more VLANs. Typically, an Ethernet frame header includes a VID that identifies the subscriber associated with the Ethernet packet; however, some customer networks may be unable to support or may fail to include a VID within the Ethernet frame header.

As described below in more detail, in instances where the Ethernet header frame does not include a VID, the dynamic configuration techniques described herein allow network device 4 to dynamically build a primary VLAN sub-interface (PVS) and a subscriber VLAN sub-interface (SVS) over a VLAN major interface statically built over an Ethernet port of network device 4. Network device 4 may build the PVS based on Ethernet tagging information included within a plurality of protocol signaling packets. Network device 4 may build the SVS based on one or more subscriber information strings, i.e., ACIs, included within the plurality of protocol signaling packets. In general, a PVS refers to a VLAN sub-interface that network device 4 associates with one of network switches 6, and a SVS refers to a VLAN sub-interface that network device 4 associates with a particular one of subscriber devices 8. A VLAN major interface comprises a statically built interface capable of servicing multiple subscribers.

Network device 4 may identify one or more of subscriber devices 8 associated with received packets that may not include VIDs in order to dynamically build both the PVS and SVS for the identified ones of subscriber devices 8. When network device 4 builds the SVS, network device 4 populates a table that associates information relating to the corresponding subscriber with the SVS. For example, when dynamically building a PVS and an SVS based on a DHCP discovery packet, network device 4 may create an entry in an IP host table that associates the source IP address of the DHCP discovery packet and the PVS on which the DHCP discovery packet was received with the SVS that network device 4 is building. When network device 4 subsequently receives an IP data packet, network device 4 can extract the source IP address from the IP information of the packet header. Network device 4 may then access the IP host table and, using the source IP address as a key, resolve the data packet to the correct SVS. Alternatively, network device may create an entry in the IP host table that associates an Ethernet MAC source address and the PVS with the SVS, and uses the MAC source address as a key to resolve the data packet to the SVS.

When network device 4 creates the PPPoE sub-interface over the major interface, network device 4 initializes a PPPoE session between the subscriber device 8 and network device 4. Network device 4 returns a session ID to subscriber device 8. The session ID is used as an identifier, and is included in each data packet associated with the session. When dynamically building a PVS and an SVS based on a PPPoE PADI packet or a PPPoE PADR packet, network device 4 creates an entry in a session table that associates the session ID of the packet with the PPPoE sub-interface that is stacked over the SVS that network device 4 is building. When network device 4 subsequently receives a PPPoE data packet, network device 4 can extract the session ID from a PPPoE portion of the packet header. Network device 4 may then access the session table and, using the session ID as a key, resolve the data packet to the correct SVS. In this way, despite receiving data packets having no VIDs or subscriber information strings, network device 4 may resolve the data packets to the correct SVS and continue to provide subscriber specific services to subscriber devices 8.

Although described for purposes of example with respect to resolving IP or PPPoE data packets to an SVS using upper-layer protocol information, the principles of the may be applied to any situation in which an interface or a session on a network device is established using subscriber or device identifiers that are present in control packets but not in data packets of a protocol. A network device may use other information contained in any protocol layer of the data packet that may be used to identify the subscriber or subscriber device to identify the proper interface for received data packets. For example, the network device may use upper-layer protocol information or lower-layer protocol information to identify the interface. As used herein, the term "lower-layer protocol" refers to protocols below a particular protocol by which the network device receives the packets from the clients.

Figure 2:
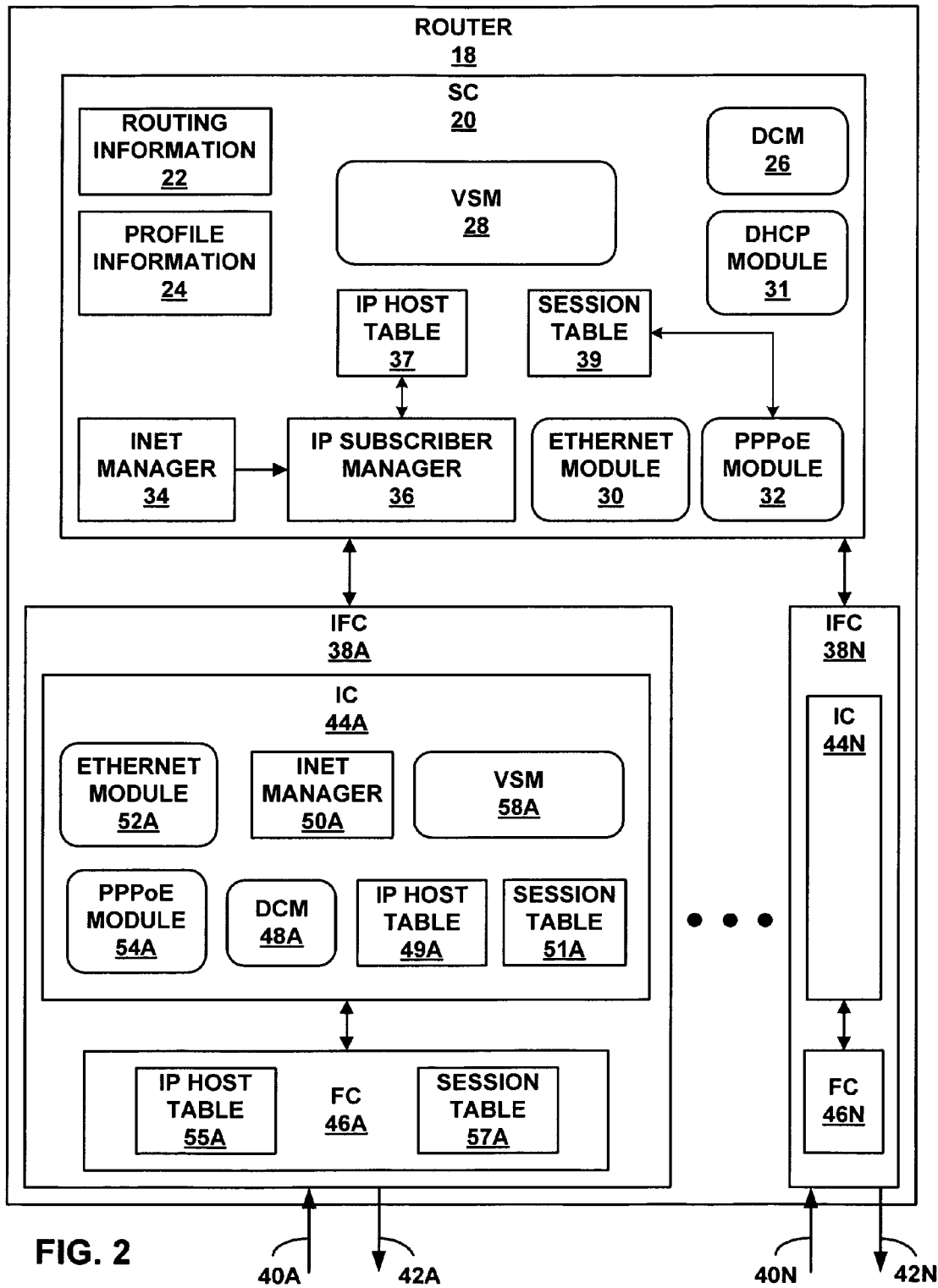
FIG. 2 is a block diagram illustrating an exemplary embodiment of a router.

FIG. 2 is a block diagram illustrating an exemplary embodiment of a router 18. Router 18 may operate substantially similar to network device 4 depicted in FIG. 1 in that router 18 is capable of dynamically configuring a VLAN interface despite receiving packets that do not include VIDs, and resolving incoming data packets to the correct SVS interface consistent with the principles of the invention. Router 18 automatically determines a subscriber associated with a received Ethernet signaling packet based on a subscriber information string, or ACI, included within the Ethernet frame header, and dynamically builds both a PVS and a SVS over a statically configured VLAN major interface for the subscriber. After building the PVS and SVS, router 18 may dynamically build an interface stack over the SVS interface.

In the illustrated embodiment, router 18 includes a system controller (SC) 20 that maintains routing information 22 to reflect the current topology of a network, e.g., network 10 of FIG. 1, and other network entities to which router 18 is connected. SC 20 also maintains profile information 24 that may be applied to the static VLAN major interface. Profile information 24 may include commands that enable the dynamic building of PVSs and SVSs, as well as protocol interface stacks over the VLAN major interface based on the subscriber information strings.

SC 20 includes a dynamic configuration manager (DCM) 26 responsible for servicing requests for the dynamic creation of PVSs and SVSs. SC 20 may further include a VLAN subscriber manager (VSM) 28 that maintains information used to determine whether a SVS exists to handle a specific subscriber information string. SC 20 further includes an Ethernet module 30, a DHCP module 31, a PPPoE module 32, an inet manager 34, and an IP subscriber manager 36. In addition, SC 20 includes IP host table 37 populated by IP subscriber manager 36, and a session table 39 populated by PPPoE module 32.

Router 18 also includes interface cards (IFCs) 38A-38N ("IFCs 38") that receive packets on inbound links 40A-40N ("inbound links 40") and send packets on outbound links 42A-42N ("outbound links 42"). IFCs 38 are coupled to SC 20, typically via a high-speed switch (not shown). In this example, each of IFCs 38 is substantially similar, and for simplicity IFC 38A is shown in more detail than IFC 38N. IFCs 38 include respective interface controllers (IC) 44A-44N ("ICs 44") and forwarding controllers (FC) 46A-46N ("FCs 46"). When FCs 46 receive protocol signaling packets from subscribers, e.g., subscriber devices 8 of FIG. 1, on inbound links 40 and a system administrator has configured router 18 to dynamically build VLAN interfaces based on subscriber information strings, FCs 46 exceptions the protocol signaling packets to ICs 44. Although illustrated as located within IFCs 38, ICs 46 and FCs 48 may be located in other components of router 18, such as SC 20.

ICs 44 respectively include DCMs 48A-48N ("DCMs 48"), IP host tables 49A-49N ("IP host tables 49"), inet managers 50A-50N ("inet managers 50"), session tables 51A-51N ("session tables 51"), Ethernet modules 52A-52N ("Ethernet modules 52"), PPPoE modules 54A-54N ("PPPoE modules 54"), and VSMs 58A-58N ("VSMs 58"). FCs 46 respectively include IP host tables 55A-55N ("IP host tables 55") and session tables 57A-57N ("session tables 57"). A system administrator statically builds a VLAN major interface over each Ethernet port included on FCs 46. The system administrator may also statically configure the VLAN major interface to allow the building and configuration of PVSs and SVSs, as well as interface stacks over the VLAN major interface. In some embodiments, the system administrator may statically configure the VLAN major interface by assigning a profile included within profile information 24 to the VLAN major interface. Typically, the profile includes commands that configure the VLAN major interface in this manner.

As illustrated in FIG. 2, both SC 20 and ICs 44 may include similar components, such as respective DCMs 26 and 48, VSMs 28 and 58, Ethernet modules 30 and 52, PPPoE modules 32 and 54, inet managers 34 and 50, IP host tables 37 and 49, and session tables 39 and 51. Duplicate components result because of the way in which router 18 handles protocol signaling packets from varying protocols. For example, most DCHP signaling packets initiate transactions that SC 20 handles; however, PPPoE signaling packets initiate transactions that ICs 44 handle. Although these components reside separately within SC 20 and ICs 44, they perform substantially similar functions. DCMs 48 of ICs 44, for example, perform substantially the same function as described in reference to DCM 28 of SC 20. In instances where the components manage a set of synchronized data, such as VSMs 28, 58, one or more of these components may serve as a master and the others as servants to prevent race conditions, i.e., conditions resulting in unsynchronized data. For purposes of illustration, it is assumed herein that VSM 28 maintains the master copy of the information used to determine whether an SVS exists for a specific subscriber information string, while VSMs 58 maintain copies of the master. However, the principles of the invention should not be limited to this configuration.

Initially, after a system administrator statically builds and assigns a profile to the VLAN major interface to enable dynamic creation of a PVS and SVSs, FC 46A, for example, may receive a packet. In accordance with the principles of the invention, FC 46A first determines whether the packet is a protocol signaling packet. If the packet is not a protocol signaling packet, FC 46A either forwards the packet as discussed below, or drops the packet. However, if the packet is a protocol signaling packet, FC 46A determines whether an interface stack exists to handle the packet.

In the case where the protocol signaling packet comprises a DHCP discovery packet, FC 46A determines whether a PVS associated with VID in the packet's VLAN header exists. If it does, FC 46A determines whether there is an IP interface over the PVS. If no PVS or IP interface exist, FC 46A exceptions the DHCP packet to Ethernet module 52A on IC 44A. If an IP interface does exist, FC 46A exceptions the DHCP packet directly to the IP interface, which then sends the packet to DHCP module 31 on SC 20. In the case where the protocol signaling packet comprises either a PPPoE PADI packet or a PPPoE PADR packet, FC 46A exceptions the PPPoE packet to Ethernet module 52A on IC 44A.

Assuming that the protocol signaling packet received by FC 46A conforms to DHCP and that a PVS or an IP interface over a PVS for the packet do not exist, Ethernet module 52A receives the packet from FC 46A. Ethernet module 52A then determines from the Ethernet header encapsulating the protocol signaling packet whether a PVS exists within Ethernet module 52A to handle the tagging information included within the Ethernet header. If a PVS does not exist to handle the tagging information, Ethernet module 52A dynamically builds a PVS over the statically built VLAN major interface. Once the PVS is built, Ethernet module 52A issues a request to DCM 48A requesting that the application registered with DCM 48A for building IP interfaces build an IP interface over the newly built PVS. Generally, DCM 48A maintains a list or other data structure for identifying these registered applications. In the illustrated embodiment, inet manager 50A on IC 44A comprises the registered application responsible for creating IP interfaces. DCM 48A then sends the request to inet manager 50A to build the IP interface over the SVS for the packet.

Inet manager 50A may send the request to inet manager 34 within SC 20. In response to the request, inet manager 34 may communicate with IP subscriber manager 36 to receive authorization to dynamically create the requested IP interface within inet manager 50A based on information received from inet manager 50A in IC 44A. Inet manager 34 of SC 20 may then send an authorization message concerning the new IP interface to inet manager 50A of IC 44A that authorizes inet manager 50A to dynamically build the IP interface within inet manager 50A over the PVS. IC 44A then drops the original DHCP signaling packet, thereby forcing a DCHP retry.

Upon receiving a retransmission of the original DHCP signaling packet, FC 46A once again determines whether an IP interface over a PVS for the packet exists and discovers that the newly built IP interface exists. FC 46A then exceptions the packet to the IP interface within inet manager 50A on IC 44A. Inet manager 50A sends the packet to DHCP module 31 on SC 20. If DHCP module 31 is configured to look for option-82 traffic, DHCP module 31 may discover a subscriber information string within an option-82 field included in the DHCP signaling packet. DHCP local and external servers within DHCP module 31 generate an event upon receiving any option-82 traffic. The event contains the subscriber information string of the DHCP packet.

DHCP module 31 of SC 20 sends the event to VSM 28 of SC 20. When VSM 28 receives the event, it determines whether the subscriber information string sent within the event corresponds to an existing SVS. VSM 28 maintains a mapping of subscriber information strings to SVSs within Ethernet modules 52 of ICs 44 and performs a lookup of this mapping using the subscriber information string as a key. The mapping may resemble a typical database, where VSM 28 maintains the master copy of this mapping, VSMs 58 of ICs 44 contain replicates of the master, and VSMs 28, 58 adhere to strict database rules to prevent database corruption.

If no SVS exists, VSM 28 adds a new entry to the mapping corresponding to the pair between the new SVS and the subscriber information string. VSM 28 issues a request to DCM 26 on SC 20 that the registered application responsible for creating SVSs create a new SVS to handle this particular subscriber information string. In the illustrated embodiment, Ethernet module 30 comprises the registered application for dynamically building SVSs. DCM 26 sends the request to Ethernet module 30, which in turn, sends the request to Ethernet module 52A. Ethernet module 52A then dynamically builds an SVS over the static VLAN major interface to handle the subscriber information string. Upon building the SVS, VSM 28 may receive a message indicating that the requested SVS was successfully built within Ethernet module 52A. In response to this message, VSM 28 may synchronize its mapping with those maintained by VSMs 58, thereby causing VSM 58A, for example, to update its mapping to reflect the addition of the SVS.

In conjunction with the building of the SVS, IP subscriber manager 36 adds a new entry to IP host table 37 that maps the new SVS to certain information that can be found in data packets received from the subscriber device 8 associated with the new SVS. In one embodiment, IP subscriber manager 36 may add an entry to IP host table 37 that maps the SVS to both the source IP address of the original DCHP signaling packet and the PVS that has been built to handle the tagging information. The source IP address of the original DCHP signaling packet may be obtained, for example, from the IP header encapsulating the DCHP signaling packet. In another embodiment, IP subscriber manager 36 may add an entry to IP host table 37 that maps the IP interface over the SVS to both the source IP address of the original DCHP signaling packet and the IP interface over the PVS. IP host table 37 may resemble a typical database, where IP subscriber manager 36 maintains the master copy of this mapping, ICs 44 and FCs 46 contain replicas of the master, and SC 20, ICs 44, and FCs 46 adhere to strict database rules to prevent database corruption. In both of these example embodiments, the Ethernet MAC source address contained within the data packet may be used as an identifier instead of the source IP address. In this manner, when router 18 subsequently receives a data packet from one of subscriber devices 8, router 18 may use upper-protocol information contained in the data packet to look up the SVS in IP host table 37 and resolve the data packet to the proper SVS.

After building the SVS, Ethernet module 52A looks up the higher-level protocol type for the DHCP packet and issues a request to DCM 48A requesting that the registered application responsible for dynamically building IP interfaces, i.e., inet manger 50A, dynamically builds an IP interface over the newly built SVS. DCM 48A sends the request to inet manager 50A, which dynamically builds the IP interface over the SVS, in the manner described above. Once inet manager 50A builds this IP interface, router 18 may distinguish between subscriber devices residing within the same VLAN based on the subscriber information strings included in subsequent packets from the subscriber devices.

If FC 46A receives packets that are not packet signaling packets, such as IP data packets, FC 46A will drop the packets if an interface is not yet established for the packets or will forward the packets to the appropriate SVS interface of an active session for the packets. In the case of receiving an IP data packet, FC 46A may access IP host table 55A to look up the source IP address of the IP data packet and the IP interface over the PVS on which the data packet was received. For example, in one embodiment FC 46A looks up the source IP address of the data packet and the PVS the data packet came in on, and obtains the SVS to which the data packet should be forwarded. In another embodiment, FC 46A looks up the source IP address of the data packet and the IP interface over the PVS that the data packet came in on, and obtains the IP interface over the SVS. Alternatively, FC 46A may look up the Ethernet MAC source address instead of the source IP address. From this information, FC 46A can determine the correct destination SVS for the data packet. For example, a downward pointer associated with the IP interface points to the SVS. FC 46A then forwards the data packet to the correct SVS. Alternatively, FC 46A may pass the data packet up to IC 44A or even SC 20 to be resolved to the correct SVS with reference to IP host table 49A or IP host table 37, respectively.

Assuming that the protocol signaling packet received by FC 46A conforms to PPPoE PADI or PADR, Ethernet module 52A receives the packet from FC 46A. Ethernet module 52A then determines from the Ethernet header encapsulating the protocol signaling packet whether a PVS exists within Ethernet module 52A to handle the tagging information included within the Ethernet header. If a PVS does not exist to handle the tagging information, Ethernet module 52A dynamically builds a PVS over the statically built VLAN major interface, as described above in the context of a DHCP signaling packet. However, unlike the processing of a DHCP signaling packet, Ethernet module 52A does not need to drop the PPPoE protocol signaling packet after building the PVS for the packet. Once the PVS for the packet exists, Ethernet module 52A sends the packet to VSM 58A of IC 44A. VSM 58A cracks the PPPoE signaling packet to retrieve the subscriber information string stored within the DSL Forum Vendor specific tag of the PPPoE signaling packet. Using the subscriber information string as a key, VSM 58A accesses its maintained information, or replica mapping, to determine whether an SVS exists to handle this string.

If no SVS exists, VSM 58A issues a request to DCM 48A requesting that the registered application responsible for dynamically building SVSs, i.e., Ethernet module 52A, dynamically build an SVS interface to handle this particular subscriber information string. Upon receiving the request, Ethernet module 52A dynamically builds the SVS over the VLAN major interface within Ethernet module 52A. Ethernet module 52A may then issue a message to DCM 48A indicating that the SVS was successfully built. DCM 48A sends this message to VSM 58A. In response to this message, VSM 58A may synchronize its mapping with the mapping maintained by VSM 28 on SC 20, thereby causing VSMs 58 to update their mapping to reflect the addition of the SVS.

After building the SVS, Ethernet module 52A looks up the higher-level protocol type for the PPPoE packet, and issues a request to DCM 48A of IC 44A requesting that the responsible registered application, i.e., PPPoE module 54A, dynamically build a PPPoE major interface over the SVS. DCM 48A sends the request to PPPoE module 54A, and PPPoE module 54A builds the PPPoE major interface over the SVS. PPPoE module 54A may respond to the request by sending a message to Ethernet module 52A indicating that the PPPoE major interface was successfully built.

Once the PPPoE major interface is built, FC 46A may receive a PPPoE Active Discover Session-Confirmation (PADS) packet and forward the PADS packet to Ethernet module 52A, which in turn sends the PADS packet to PPPoE module 54A to establish a PPPoE session. In response to the PADS packet, PPPoE module 54A dynamically builds the remaining PPPoE interface layers. During this session establishing procedure, PPPoE module 54A may build a PPPoE sub-interface over the PPPoE interface, over which it may build a PPP interface, and over which it may build an IP interface. These techniques may enable a network device, such as router 18, to differentiate between packets conforming with both DHCP and PPPoE even though the packets may only include a single-tagged VID or no VID.

In addition, in conjunction with the building of the SVS, PPPoE major interface, PPPoE sub-interface, PPP interface, and IP interface, PPPoE module 54A may add a new entry to session table 51A that maps the new SVS to certain information that can be found in PPPoE data packets received from the subscriber device 8 associated with the new SVS. For example, PPPoE module 54A may add an entry to session table 51A that maps the session ID of the current PPPoE session to the PPPoE sub-interface that was just built. The session ID may be obtained, for example, from the Ethernet header encapsulating the PPPoE PADI or PADR signaling packet. Session table 51A may resemble a typical database. IC 44A may synchronize its session table 51A with those maintained by SC 20 (i.e., session table 39) and FC 46A (i.e., session table 57A), thereby causing SC 20 and FC 46A to update their mappings to reflect the addition of the SVS. In this manner, when router 18 subsequently receives a data packet from one of subscriber devices 8, router 18 may use upper-protocol information contained in the data packet to look up the SVS in IP host table 37 and resolve the data packet to the proper SVS by looking up the session ID of the data packet in session table 51A.

After establishment of the PPPoE session for packets including a particular session ID, if FC 46A receives PPPoE Active Discover Termination (PADT) packets, FC 46A exceptions the PPPoE PADT packets directly to PPPoE interface stack. On the other hand, FC 46A will continue to exception PPPoE PADI and PADR packets to Ethernet module 52A even after the session has been established.

If FC 46A receives a packet that is not a PPPoE signaling packet, such as PPPoE data packet, FC 46A may look up the session ID of the PPPoE data packet in session table 57A to obtain the PPPoE sub-interface. From this information, FC 46A can determine the correct destination SVS for the data packet. For example, a downward pointer associated with the PPPoE sub-interface points to the SVS. FC 46A then forwards the data packet to the correct SVS. Alternatively, FC 46A may pass the data packet up to IC 44A or even SC 20 to be resolved to the correct SVS with reference to session table 51A or session table 39, respectively.

Figure 3A:
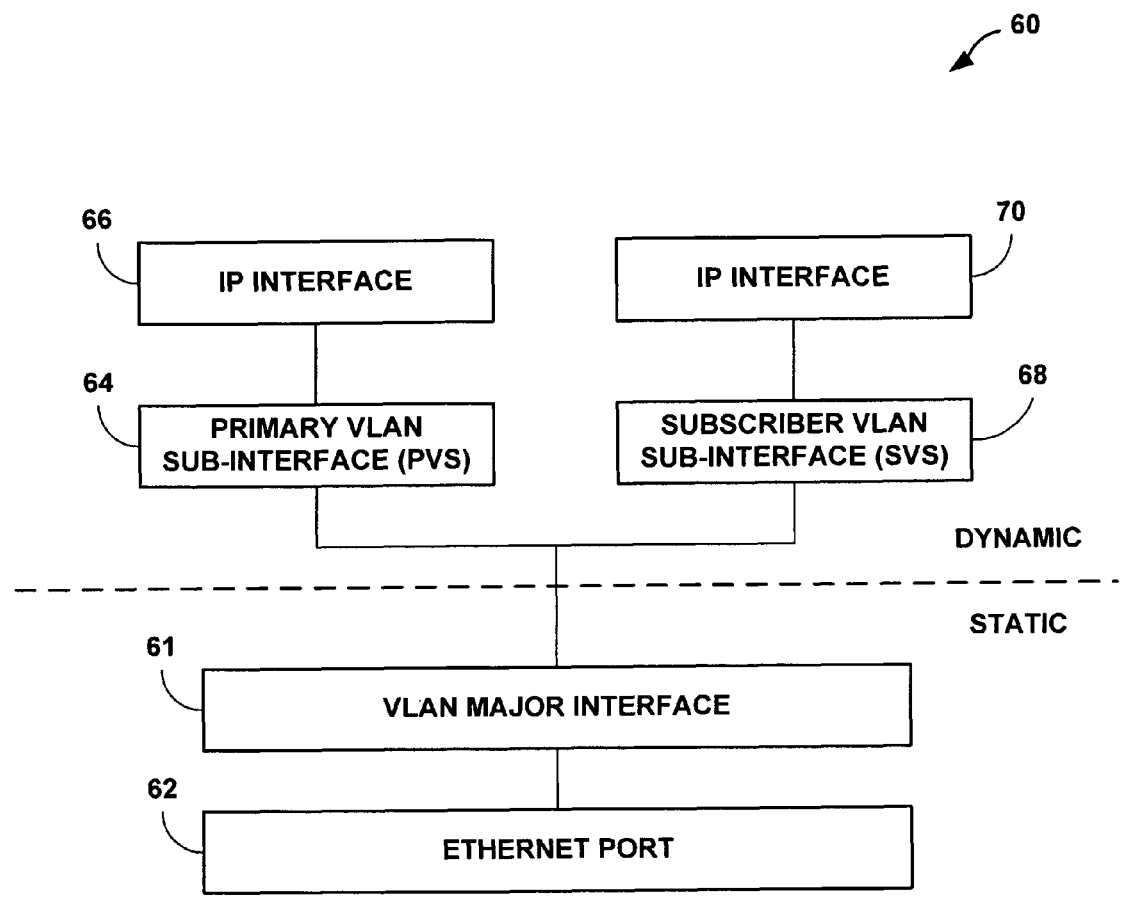
FIG. 3A is a block diagram illustrating an exemplary embodiment of Dynamic Host Configuration Protocol (DHCP) dynamic interface stacks built over a static virtual local area network (VLAN) major interface.

FIG. 3A is a block diagram illustrating an exemplary embodiment of a DHCP dynamic interface stack 60 built over a static VLAN major interface 61, in accordance with an embodiment of the invention. Dynamic interface stack 60 includes an Ethernet port 62 and a VLAN major interface 61 statically created by a system administrator, as described above. For purposes of illustration, dynamic interface stack 60 is described in reference to actions performed by router 18 of FIG. 2; however, any network device capable of dynamically building VLAN interface stacks may implement these techniques and the principles of the invention should not be limited as such.

Dynamic interface stack 60 may not exist within any particular component of router 18 of FIG. 2 and may merely represent a logical stacking of interfaces within various components. For example, Ethernet module 52A may maintain VLAN major interface 61, PVS 64, and SVS 68; and inet manager 50A may maintain IP interfaces 66 and 70. FC 46A may be aware of this logical stacking via conventional techniques and exception packets to the managing component, as described above.

In the illustrated embodiment, Ethernet port 62 may comprise one of a Fast Ethernet interface, a Gigabit Ethernet interface, a 10-Gigabit Ethernet interface, or any other type of Ethernet network interface. VLAN major interface 61 may be statically configured to enable dynamic building and configuration of a PVS, such as PVS 64, and SVSs, such as SVS 68. The system administrator may enter commands at a command line interface or assign a profile to VLAN major interface 61 to enable the dynamic building and configuration of a PVS and SVSs. In addition, the profile may comprise attributes that specify a type of interface column to be dynamically built over the VLAN minor interface.

As described above, one of FCs 46 of router 18 (e.g., FC 46A) receives a first Ethernet packet on an Ethernet port, such as Ethernet port 62, over which VLAN major interface 61 is statically built. FC 46A determines whether the packet comprises a protocol signaling packet and, if so, next determines whether an IP interface over a PVS for the packet exists. If no IP interface exists, FC 46A exceptions the DHCP signaling packet to Ethernet module 52A within IC 44A. Ethernet module 52A first determines the protocol to which the protocol signaling packet corresponds. In the illustrated embodiment, Ethernet module 52A receives and detects a DHCP signaling packet, such as a DHCP discovery packet. In other embodiments, Ethernet module 52A may receive and detect a PPPoE signaling packet, such as a PADI signaling packet or a PADR signaling packet.

Ethernet module 52A of IC 44A analyzes the Ethernet header tagging information included in the received packet. In cases where the Ethernet header tagging information does not correspond to an existing PVS, Ethernet module 52A performs the functions described above to dynamically build PVS 64 over VLAN major interface 61. After creating PVS 64, Ethernet module 52A requests inet manager 50A to build IP interface 66 over PVS 64 via DCM 48A, as described above.

Next, IC 44A drops the DHCP signaling packet forcing a DHCP retry, which in turn results in FC 46A receiving another DHCP signaling packet identical to the first protocol signaling packet. FC 46A again determines whether an IP interface over a PVS for the packet exists. Upon determining that the newly created IP interface over the PVS for the packet exists, FC 46A exceptions the packet up to the IP interface within inet manager 50A. Inet manger 50A then sends the packet to DHCP module 31 of SC 20. DHCP module 31 sends an event to VSM 28 containing the subscriber information string, which DHCP module 31 retrieves from the DHCP signaling packet. VSM 28 performs a lookup of its mapping using the subscriber information string as a key.

Upon determining that no SVS exists to handle the subscriber information string, VSM 28 performs the actions described above to request Ethernet module 52A to build SVS 68 over VLAN major interface 61 via DCM 26 and Ethernet module 30 of SC 20. During these actions, VSM 28 updates its mapping, as do VSMs 58 of ICs 44, to maintain accurate and synchronized mapping information. Once SVS 68 is built, Ethernet module 52A requests via DCM 48A that inet manager 50A dynamically build IP interface 70 over SVS 68, as described above. In this way, router 18 dynamically builds the interface stack necessary to handle IP traffic associated with the subscriber information string included in the received packet. In addition, as described above, IP subscriber manager 36 adds a new entry to IP host table 37 that maps the new SVS 68 to certain information that can be found in data packets received from the subscriber device 8 associated with the new SVS 68. By dynamically creating SVS 68 and the overlaying IP interface 70, router 18 may distinguish between packets arriving from the subscriber associated with SVS 68 and other packets from other subscribers.

Figure 3B:
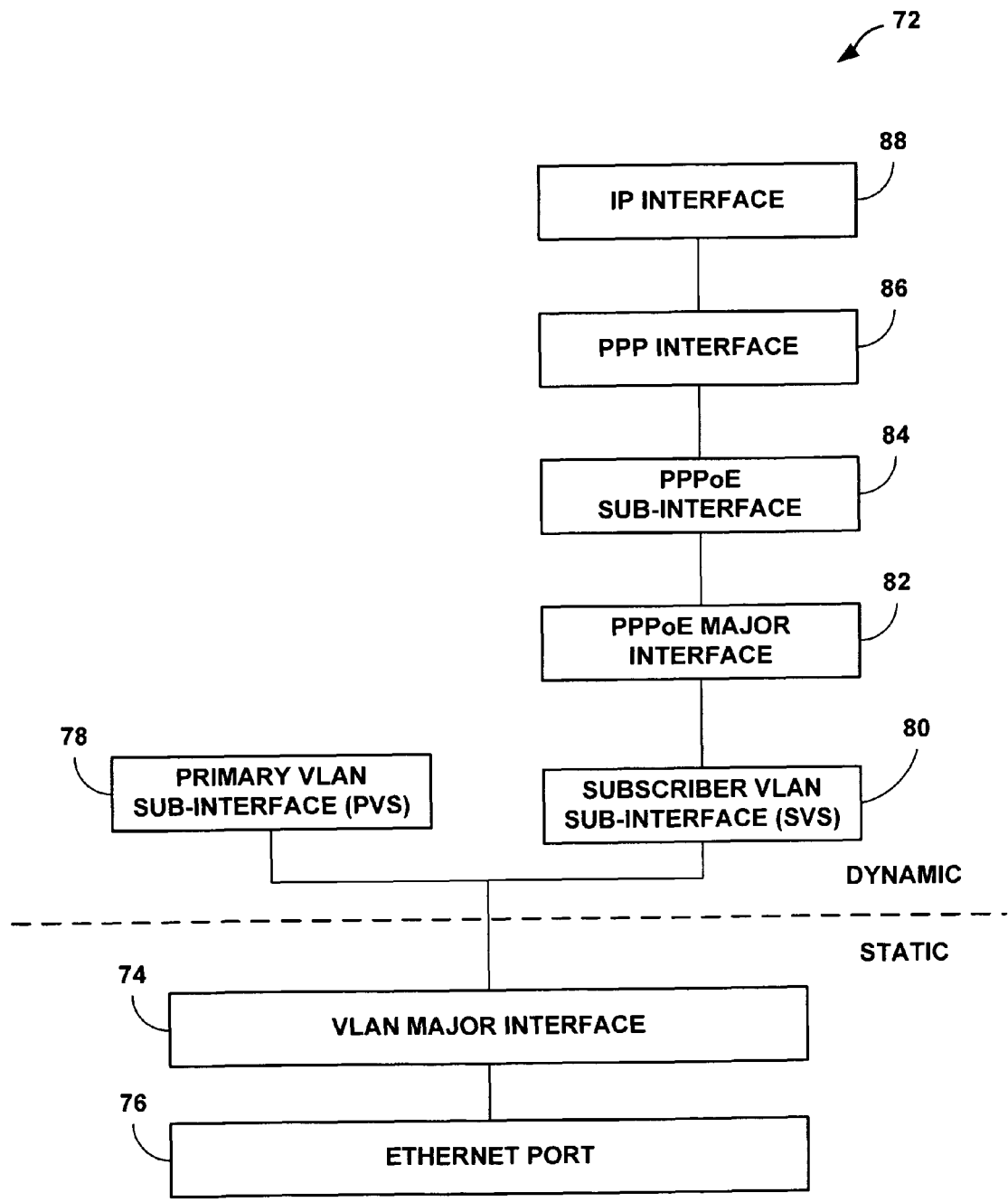
FIG. 3B is a block diagram illustrating an exemplary embodiment of Point-to-Point Protocol over Ethernet (PPPoE) dynamic interface stacks built over a static VLAN major interface.

FIG. 3B is a block diagram illustrating an exemplary embodiment of a PPPoE dynamic interface stack 72 built over a static VLAN major interface 74, in accordance with an embodiment of the invention. Dynamic interface stack 72 includes an Ethernet port 76 and a VLAN major interface 74 statically created by a system administrator, as described above. For purposes of illustration, dynamic interface stack 72 is described in reference to actions performed by router 18 of FIG. 2; however, any network device capable of dynamically building VLAN interface stacks may implement these techniques and the principles of the invention should not be limited as such.

Dynamic interface stack 72 may not exist within any particular component of router 18 of FIG. 2 and may merely represent a logical stacking of interfaces within various components. For example, Ethernet module 52A may maintain VLAN major interface 74, PVS 78, and SVS 90; and PPPoE module 54A may maintain PPPoE major interface 82, PPPoE sub-interface 84, PPP interface 86, and IP interface 88. FC 46A may be aware of this logical stacking via conventional techniques and exception packets to the managing component described above.

In this example, Ethernet port 76 may comprise one of a Fast Ethernet interface, a Gigabit Ethernet interface, or a 10-Gigabit Ethernet interface or any other type of Ethernet network interface. VLAN major interface 74 may be statically configured to enable dynamic building and configuration of a PVS, such as PVS 78, and SVSs, such as SVS 80. The system administrator may enter commands at a command line or assign a profile to VLAN major interface 74 to enable this dynamic building and configuration of a PVS and SVSs. In addition, the profile may comprise attributes that specify a type of interface stack to be dynamically built over the VLAN minor interface.

As described above, one of FCs 46 of router 18 (e.g., FC 46A) receives a first Ethernet packet on an Ethernet port, such as Ethernet port 76, over which VLAN major interface 74 is statically built. FC 46A determines whether the packet comprises a protocol signaling packet, such as a PPPoE PADI or PADR packet, and, if so, exceptions the protocol signaling packet to Ethernet module 52A within IC 44A. Ethernet module 52A first determines the protocol to which the protocol signaling packet corresponds. In the illustrated embodiment, Ethernet module 52A receives and detects a PPPoE protocol signaling packet. As described above, in other embodiments, Ethernet module 52A may receive and detect a DHCP signaling packet, such as a DHCP discovery packet.

Ethernet module 52A analyzes the Ethernet header tagging information included in the received packet. In cases where the Ethernet header tagging information does not correspond to an existing PVS, Ethernet module 52A performs the functions described above to dynamically build PVS 78 over VLAN major interface 74. However, contrary to the DHCP context, an IP interface does not need to be built over PVS 78 in the PPPoE context.

Ethernet module 52A then communicates the subscriber information string stored within the PPPoE signaling packet to VSM 58A. Using the subscriber information string as a key, VSM 58A accesses its maintained information, or replica mapping, to determine whether an SVS exists to handle this string. If no SVS exists, VSM 58A issues a request to DCM 48A that the registered application, i.e., Ethernet module 52A, build an SVS 80 over VLAN major interface 74, as describe above. Ethernet module 52A builds corresponding SVS 80 in response to the request. Ethernet module 52A may then issue a message to DCM 48A indicating that SVS 80 was successfully built. DCM 48A sends this message to VSM 58A.

After building SVS 80, Ethernet module 52A requests via DCM 48A that PPPoE module 54A dynamically build a PPPoE major interface 82 over SVS 80, as described above. PPPoE module 54A may respond to the request by sending a message to Ethernet module 52A indicating that PPPoE major interface 82 was successfully built. Once PPPoE major interface 82 is built, FC 46A may receive a PPPoE PADS packet and forward the PADS packet to Ethernet module 52A, which in turn sends the PADS packet to PPPoE module 54A to establish a PPPoE session. In response to the PADS packet, PPPoE module 54A dynamically builds a PPPoE sub-interface 84 over PPPoE major interface 82, over which it may build a PPP interface 86, and over which it may build an IP interface 88. In this way, router 18 dynamically builds the interface stack necessary to handle IP traffic associated with the subscriber information string included in the received packet. In addition, as described above, PPPoE module 54A adds a new entry to session table 57A that maps PPPoE sub-interface 84 to the session ID associated with the new SVS 80. By dynamically creating SVS 80 and the overlaying interfaces 82-88, router 18 may distinguish between packets arriving from the subscriber associated with SVS 80 and other packets from other subscribers.

After the PPPoE interface stack is built for packets including a particular session ID, and FC 46A exceptions PPPoE PADT packets directly to PPPoE major interface 82. On the other hand, FC 46A will continue to exception PPPoE PADI and PADR packets to Ethernet module 52A even after the session has been established. FC 46A forwards data packets with the session ID directly to SVS 80 by looking up PPPoE sub-interface 84 in session table 57A using the session ID as a key.

Although both FIGS. 3A and 3B illustrate dynamic interface stacks 60, 72 having only one SVS 68, 80, both of dynamic interface stacks 60 and 72 may include multiple SVSs substantially similar to SVSs 68 and 80, where each SVS 68, 80 corresponds to a different one of subscriber devices 8. The principles of the invention should not be limited to single SVS dynamic interface stacks, and in some embodiments, several thousand SVSs may exist within a single dynamic interface stack.

Figure 4:
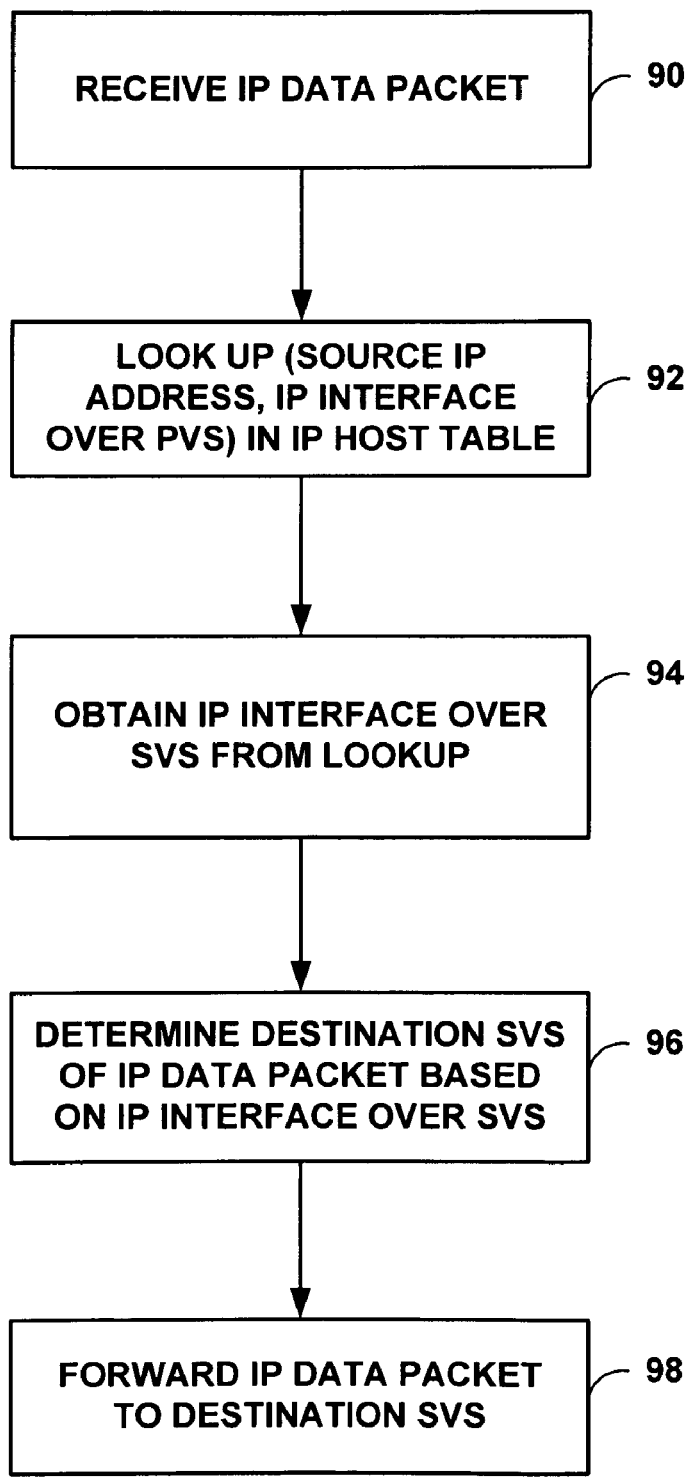
FIG. 4 is a flowchart illustrating an exemplary operation of a network device resolving an Internet Protocol (IP) data packet to a subscriber VLAN sub-interface (SVS) based on a source IP address included within the IP data packet and an IP interface over a PVS on which the IP data packet was received.

FIG. 4 is a flowchart illustrating an exemplary operation of a network device resolving a received IP data packet to an SVS based on a source IP address included within the IP data packet and an IP interface over a PVS on which the IP data packet was received. For purposes of illustration, FIG. 4 is described in reference to actions performed by router 18 of FIG. 2, and referring to interface stack 60 of FIG. 3. FC 46A receives an incoming IP data packet via inbound link 40A (90). FC 46A obtains the source IP address of the IP data packet by accessing a subscriber-specific portion of the IP header of the data packet.

FC 46A may perform a lookup within IP host table 55A using as a key the combination of the source IP address of the IP data packet and the IP interface 66 over PVS 64 over which the IP data packet was received (92). From the lookup, FC 46A determines that the IP interface over the SVS is IP interface 70 (FIG. 3A) (94). Based on this information, FC 46A can resolve the IP data packet to the destination SVS, i.e., SVS 68 (96). FC 46A then forwards the IP data packet to SVS 68 (98). Forwarding of the IP data packet then proceeds in a conventional manner. In this way, router 18 resolves the received IP data packet to the SVS associated with the subscriber device 8 from which it is received, despite that neither a VLAN identification tag nor a subscriber identification string is present within the IP data packet. In addition to using the IP host tables for VLAN management, router 18 may use the IP host tables for subscriber management. In other embodiments, upon receipt, FC 46A may pass the IP data packet up to IC 44A or SC 20, which may instead look up the source IP address of the IP data packet and the IP interface 66 over PVS 64 over which the IP data packet was received in the respective IP host table 49A, 37 to resolve the packet to the correct SVS.

Figure 5:
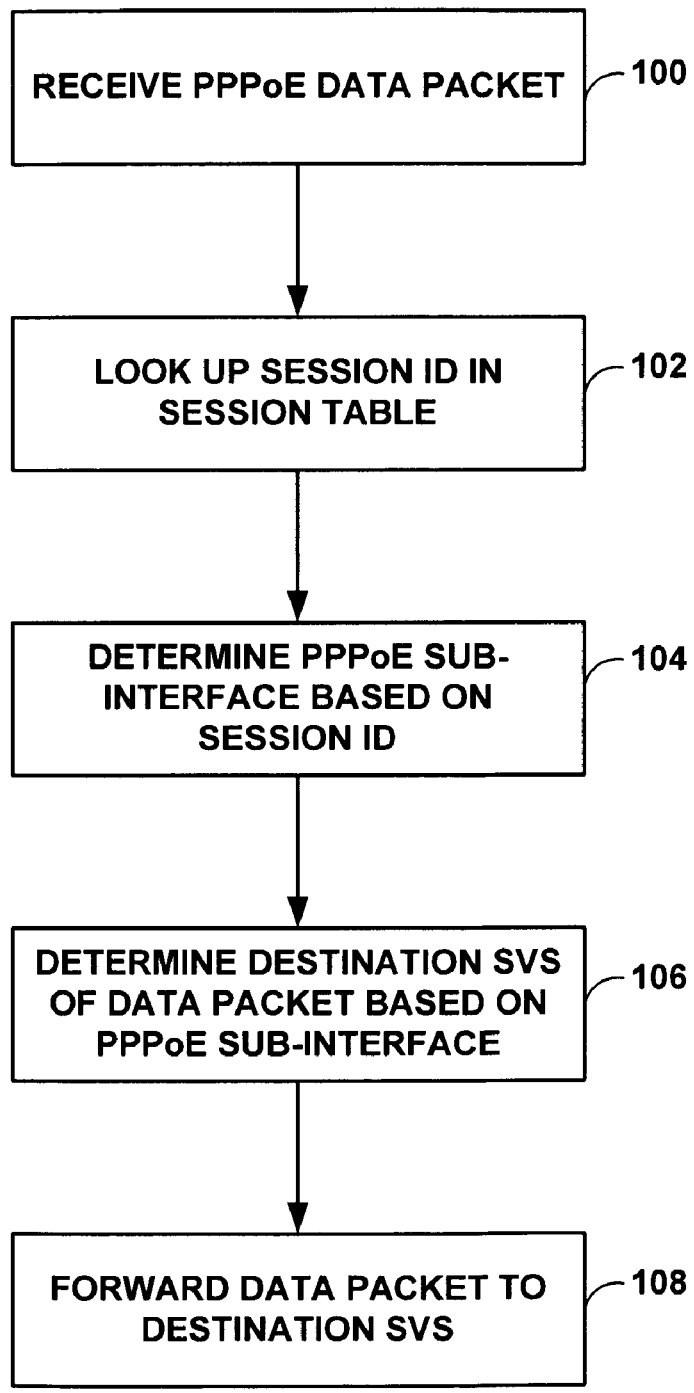
FIG. 5 is a flowchart illustrating an exemplary operation of a network device resolving a PPPoE data packet to an SVS based on a session ID included within the PPPoE data packet.

FIG. 5 is a flowchart illustrating an exemplary operation of a network device resolving a PPPoE data packet to an SVS based on a session ID included within the PPPoE data packet. For purposes of illustration, FIG. 5 is similarly described in reference to actions performed by router 18 of FIG. 2, and referring to interface stack 60 of FIG. 3. FC 46A receives an incoming PPPoE data packet via inbound link 40A (100). FC 46A obtains the session ID of the PPPoE data packet by accessing a subscriber-specific portion of the Ethernet header of the data packet.

FC 46A may perform a lookup within session table 57A using the session ID as a key (102). From the lookup, FC 46A determines that the PPPoE sub-interface associated with the session ID is PPPoE sub-interface 84 (FIG. 3B) (104). Based on this information, FC 46A can resolve the IP data packet to the destination SVS, i.e., SVS 80 (106). FC 46A then forwards the IP data packet to SVS 80 (108). Forwarding of the PPPoE data packet then proceeds in a conventional manner. In this way, router 18 resolves the received PPPoE data packet to the SVS associated with the subscriber device 8 from which it is received, despite that neither a VLAN identification tag nor a subscriber identification string is present within the PPPoE data packet. In other embodiments, upon receipt, FC 46A may pass the PPPoE data packet up to IC 44A or SC 20, which may instead look up the session ID of the PPPoE data packet in the respective session table 51A, 39 to resolve the packet to the correct SVS.

In this manner, a network device, such as router 18, acting in accordance with the principles of the invention may resolve data packets to the appropriate SVS based on upper-protocol information contained within the data packet. While described in reference to data packets, other packet types of varying other protocols may contain information by which a network device may resolve the packet to a VLAN interface, and the invention should not be limited as such. By applying the principles of the invention to routers that include BRAS functionality, the router may distinguish between subscriber devices, thereby allowing the BRAS application to provide subscriber specific services despite the lack of VID information and subscriber information strings in data packets. Various embodiments of the invention have been described. These and other embodiments are within the scope of the following claims.

What is claimed is:

1. A method comprising:
   receiving a protocol signaling packet on an Ethernet port of a network device, wherein the protocol signaling packet includes Ethernet tagging information and a subscriber information string;
   dynamically building within the network device a primary VLAN sub-interface (PVS) based on the Ethernet tagging information and a subscriber virtual local area network (VLAN) sub-interface (SVS) based on the subscriber information string;

receiving a data packet on an Ethernet port of a network device;
accessing upper-layer protocol information contained in the data packet; and
determining an SVS of the network device to which to forward the data packet based on the upper-layer protocol information.

2. The method of claim 1, further comprising:
adding an entry to a table associating the upper-layer protocol information with the dynamically built SVS.

3. The method of claim 2,
wherein receiving a data packet comprises receiving the data packet from a subscriber device, wherein the data packet does not contain an identifier of a VLAN interface with which the data packet is associated that would allow the network device to identify the subscriber device,
further comprising accessing the table to resolve the data packet to the SVS, wherein the SVS is associated with the subscriber device.

4. The method of claim 1, wherein the network device comprises a second network device,
further comprising, prior to receiving the data packet at the second network device, removing from the data packet an identifier of a VLAN interface with which the data packet is associated at a first network device, and
forwarding the data packet from the first network device to the second network device.

5. The method of claim 1, further comprising forwarding the data packet to the SVS based on the determination.

6. The method of claim 1, wherein determining the SVS based on the upper-layer protocol information comprises looking up the upper-layer protocol information in a table that maps the upper-layer protocol information to the SVS.

7. The method of claim 1, wherein receiving a data packet comprises receiving an Internet Protocol (IP) data packet, and wherein accessing upper-layer protocol information comprises accessing one of a source IP address and an Ethernet MAC source address from the IP data packet.

8. The method of claim 7,
wherein determining the SVS on which to forward the data packet comprises looking up the source IP address and the IP interface over a primary VLAN sub-interface (PVS) on which the IP data packet was received in an IP host table that returns an IP interface over the SVS,
further comprising determining the SVS based on the IP interface over the SVS.

9. The method of claim 7, wherein determining the SVS on which to forward the data packet comprises looking up the source IP address and a PVS on which the IP data packet was received in an IP host table that returns the SVS.

10. The method of claim 1,
wherein receiving a data packet comprises receiving a Point-to-Point Protocol over Ethernet (PPPoE) data packet,
wherein accessing upper-layer protocol information comprises accessing a session ID from the PPPoE data packet, and
wherein the session ID identifies a PPPoE session with which the PPPoE data packet is associated.

11. The method of claim 10,
wherein determining the SVS comprises looking up the session ID in a session table that returns a PPPoE sub-interface associated with the session ID,
further comprising determining the SVS based on the PPPoE sub-interface.

12. A network device comprising:
an interface that includes an Ethernet port for receiving a data packet and a protocol signaling packet;
a forwarding controller that receives the protocol signaling packet from the Ethernet port and forwards the protocol signaling packet to an interface controller, wherein the protocol signaling packet includes Ethernet tagging information and a subscriber information string; and
an Ethernet module in the interface controller that dynamically builds within the network device a primary VLAN sub-interface (PVS) based on the Ethernet tagging information and a subscriber virtual local area network (VLAN) sub-interface (SVS) based on the subscriber information string,
wherein the forwarding controller receives the data packet from the Ethernet port, the data packet including upper-layer protocol information, and
wherein the forwarding controller accesses the upper-layer protocol information and determines an SVS of the network device to which to forward the data packet based on the upper-layer protocol information.

13. The network device of claim 12, wherein the network device adds an entry to a table that associates the upper-layer protocol information with the dynamically built SVS.

14. The network device of claim 13, wherein the data packet does not contain an identifier of a VLAN interface with which the data packet is associated, and wherein the network device accesses the table to resolve the data packet to the SVS.

15. The network device of claim 12, wherein the data packet comprises one of an Internet Protocol (IP) data packet and a Point-to-Point Protocol over Ethernet (PPPoE) data packet.

16. The network device of claim 12, wherein the forwarding controller accesses one of a source IP address and an Ethernet MAC source address from the data packet.

17. The network device of claim 12, further comprising an IP subscriber manager that maintains an IP host table that maps source IP addresses and IP interfaces over primary VLAN sub-interfaces (PVSs) to IP interfaces over SVSs.

18. The network device of claim 12, further comprising an IP subscriber manager that maintains an IP host table that maps source IP addresses and PVSs to SVSs.

19. The network device of claim 12, wherein the forwarding controller retrieves a session ID from the received data packet.

20. The network device of claim 19, further comprising a PPPoE module that:
maintains a session table that maps session IDs to SVSs,
receives the retrieved session ID from the forwarding controller, and
using the retrieved session ID as a key, determines from the session table the SVS to which to forward the data packet.

21. A non-transitory computer-readable medium comprising instructions that cause a programmable processor to:
receive a protocol signaling packet on an Ethernet port of a network device, wherein the protocol signaling packet includes Ethernet tagging information and a subscriber information string;
dynamically build within the network device a primary VLAN sub-interface (PVS) based on the Ethernet tagging information and a subscriber virtual local area network (VLAN) sub-interface (SVS) based on the subscriber information string;

receive a data packet;

access upper-layer protocol information contained in the data packet; and determine an SVS of the network device to which to forward the data packet based on the upper-layer protocol information.

22. The non-transitory computer-readable medium of claim 21, wherein the instructions cause the programmable processor to:

receive the packet as an Internet Protocol (IP) data packet; and determine the SVS by accessing one of a source IP address and an Ethernet MAC source address from the IP data packet.

23. The non-transitory computer-readable medium of claim 21, wherein the instructions cause the programmable processor to:

receive the packet as a Point-to-Point Protocol over Ethernet (PPPoE) data packet, determine the subscriber VLAN SVS by accessing a session ID from the PPPoE data packet, wherein the session ID identifies a PPPoE session with which the PPPoE data packet is associated.

24. A method comprising:

receiving a control packet from a subscriber device that contains a subscriber identifier that identifies the subscriber device;

establishing an interface on a network device using the subscriber identifier;

receiving an Internet Protocol (IP) data packet from the subscriber device that does not contain the subscriber identifier on an Ethernet port of the network device;

accessing a source IP address contained in the data packet;

looking up the source IP address and an IP interface over a primary VLAN sub-interface (PVS) on which the IP data packet was received in an IP host table that returns an IP interface over a subscriber virtual local area network (VLAN) sub-interface (SVS); and determining an SVS to which to forward the data packet based on the IP interface over the SVS.

25. The method of claim 24, wherein the subscriber identifier is a subscriber identification string.

26. A method comprising:

receiving an Internet Protocol (IP) data packet on an Ethernet port of a network device;

accessing a source IP address contained in the data packet;

looking up the source IP address and an IP interface over a primary VLAN sub-interface (PVS) on which the IP data packet was received in an IP host table that returns an IP interface over a subscriber virtual local area network (VLAN) sub-interface (SVS); and determining an SVS of the network device to which to forward the data packet based on the IP interface over the SVS.

\* \* \* \* \*